United States Patent Office 3,072,488
Patented Jan. 8, 1963

3,072,488
CHEESE FLAVORING PROCESS
John C. Watts, Jr., and John H. Nelson, Waukesha, Wis., assignors to Dairyland Food Laboratories, Inc., Waukesha, Wis., a corporation of Wisconsin
No Drawing. Filed Aug. 7, 1961, Ser. No. 129,549
10 Claims. (Cl. 99—115)

The present invention relates to improved processes of preparing compositions adapted for use in the flavoring of foodstuffs.

Many foodstuffs such as salad dressing, soups of various kinds as well as baked goods such as crackers, biscuits and the like are flavored with cheese. To impart desired flavor, the cheese employed for the most part is aged cheese such as aged Cheddar or like type aged cheese. Due to the time required for aging (at least 6 months to a year) the aged cheese of this type used for flavoring is necessarily relatively expensive. A similar cost problem is also involved in the use of aged Roquefort cheese or related blue cheese. Attempts to solve this problem by using various types of modified short aging periods in an effort to reduce costs have proven unsatisfactory as a substantial aging period has been found necessary to develop the desired flavoring characteristics. Also, due to the bulk of the cheese with its substantial water content, transportation and storage of aged cheese has also posed cost problems particularly with large manufacturers who have found it necessary to store thousands of pounds of flavoring cheese to have it readily available for daily use.

The principal object of the present invention is to provide an improved process of preparing a relatively inexpensive flavoring composition.

Another object of the present invention is to provide a practical process of preparing a low cost composition adaptable for imparting desired cheese flavors to foodstuffs.

Another object is to provide a process of increasing the amount of flavoring material in the flavoring composition without aging of the composition to develop flavor.

Still another object is to provide a highly effective spore or spore-like inoculum for use in the process of preparing the flavoring composition.

Still a further object is to provide an inoculum that can be used, as such, without purification in the process of preparing the flavoring composition.

Other objects of the invention will be apparent as the description proceeds.

In the Knight application Serial No. 672,557, filed July 18, 1957, now abandoned, and the Knight copending continuation-in-part application Serial No. 69,570, filed November 16, 1960, there are described improved processes of manufacturing compositions adaptable for use in the flavoring of foodstuffs. In the Knight processes milk, e.g. pasteurized, homogenized milk, containing milk fat or fatty acids, e.g. derived from milk fat by treatment of the milk fat with lipase, are fermented under submerged aerobic conditions with filamentous fungi such as *Penicillium roqueforti* including white mutants thereof. The fermentation in the Knight processes can be carried out by inoculating the medium with a vegetative inoculum or by the use of spores as described in the Knight applications, supra, and also in the Knight copending application Serial No. 760,840, filed September 15, 1958.

Investigations in this field have shown that large amounts of true vegeative growth material, i.e. intact mycelium, dilutes out activity and tends to diminish the flavor development in the flavoring composition and, for this reason, that it is preferred to carry out the process with a spore inoculum without substantial vegetative growth. Another reason for preferring spores is that with fatty acids the conversion to the highly flavored aromatic ketones, is much more rapid with spores than with vegetative inoculum.

With the discovery that a spore inoculum was preferred, investigations were directed to the finding of a practical method of preparing large volumes of the desired spore inoculum required for commercial operations. The previously suggested method of producing spores by growing vegetative inoculum in submerged culture for 4-6 days with aeration in an aqueous cornsteep liquor-lactose nutrient medium, in accordance with standard practices in the art, and then straining and filtering the resulting fermented mixture to separate the spores from the mycelium, proved objectionable, primarily for two reasons. One, the work required to separate the spores from the large amounts of unwanted vegetative growth material proved excessive and, two, the resulting yield or concentration of spores proved to be below that desired for large scale operations. Similar objections were encountered when the spores were produced on surface culture, where the spores are scraped off of the nutrient medium and then purified by suspending in water and recovered by centrifuging.

In our investigations, in attempts to solve the spore production problem and provide an inoculum of the type desired, we discovered that the yield of spores (which term includes spore-like entities) could be greatly increased in submerged culture with aeration, e.g. using mechanical shakers, by the use of sodium chloride and/or lactose, or equivalent non-toxic salts or sugars. We also discovered when homogenized milk, skim milk or whey (including reconstituted non-fat milk solids and reconstituted whey solids) and various blends of the same were used as the aqueous culture media, that the resulting high spore count products were essentially free from true vegetative growth material and could be used as such as the inoculum without purification, i.e. without separation of the spores.

The amount of added salt or sugar or mixtures of the same used in the production of the spore inoculum can vary with optimum amounts under the culturing conditions employed being readily ascertainable by preliminary test. Ordinarily, it is preferred to start the preparation of the inoculum with a homogenized whole milk medium containing about 1-3% by weight of added salt and/or sugar and then after culturing the medium (submerged aerobic) for about 3-4 days, adding about 4-6% by weight additional salt or sugar and continuing the culturing of the medium for about another 1-2 days. The use initially of about 2% of salt and/or sugar followed by an additional 5% of salt or sugar, to provide the medium with a total of about 7% by weight of added salt and/or sugar, as described in the examples below, is in the preferred range. We have also found it advantageous, although not required, at the start of the culturing period to add a small amount, e.g. about 0.3% by weight of lactic acid, to provide the culture medium with an acidic pH of about 4.5-5.5. The culturing times and temperatures can vary somewhat with periods within 4-6 days at room temperature, e.g. 21-25° C. giving good results and being within the preferred range.

The spore inoculum used to inoculate the culture medium containing the added salt and/or sugar in the preparation of the high spore count inoculum used in the final fermentation step in the production of the flavoring composition, can be prepared in accordance with standard practices in the art. One of the preferred procedures is to wash the spores from a 5-14 day old salt culture of *P. roqueforti* grown on a mixture made up of 50% by volume of tomato-vegetable juices (e.g. V-8 juice) and 50% by volume of 3% aqueous agar solution. The resulting spores, suspended in water, which may contain an emulsifying agent such, for example as 1% Tween 80 (sorbitan monooleate), are then added to the culture medium and the resulting medium cultured as described above. The amount of spores used in this inoculum can vary although to keep the culturing period within about 4–6 days sufficient spores are preferably added to yield a level of about $5 \times 10^7$ to $5 \times 10^8$ spores/cc. of substrate. Using a substrate of this type a finished culture with a spore count (including spore-like entities) in the range of about $50 \times 10^9$ to $150 \times 10^9$ spores/cc. can be readily obtained.

The following examples will serve to illustrate the invention.

PREPARATION OF INOCULUM

Example I

About 391 grams of homogenized whole milk are added to each of a series of 1000 cc. wide mouth Erlenmeyer flasks, the flasks are plugged with cotton and the composite sterilized at about 121° C. for 12 minutes. When the sterilized milk is cooled to room temperature (21°–25° C.), 1.2 grams of sterilized lactic acid and 8 grams of sterilized salt (NaCl are then added aseptically to each flask. The resulting culture medium has a pH of about 4.5–5.5. The flasks are then inoculated with a spore suspension of a white mutant of *P. roqueforti* (U.W.–12), obtained as described above, to provide the medium with about $5 \times 10^7$ to $5 \times 10^8$ spores/cc. of substrate. The inoculated flasks are next placed on rotary shakers (approximately 160 c.p.m.) and agitated continuously for about 96 hours at room temperature. At this time 20 grams of sterilized salt are added to the culture medium aseptically in each flask and the shaker agitation is resumed and continued for an additional 24 hours. The finished culture or inoculum contains around $100 \times 10^9$ spores/cc. and is ready for use without further processing as described below in Example VI.

Example II

This example follows the procedure of Example I, except that the conventional bluish green mold, *P. roqueforti*, used in the manufacture of blue cheese, is employed in place of the white mutant of Example I. In a similar manner inocula of *P. camemberti* and other filamentous fungi can be prepared.

Example III

This example follows the procedure of Example I or II, except that lactose is added to the culture medium in place of the salt added to the culture medium in Example I or II.

Example IV

This example follows the procedure of Example I or II, except that a 50:50 mixture of salt and lactose is added to the culture medium in place of the salt to the culture medium in Example I or II. Various other mixtures of salt and sugar can also be used.

Example V (a) This example follows the procedures of the above examples except that skim milk (or the equivalent, reconstituted non-fat milk solids) is used as the culture medium in place of whole milk.

(b) This example follows the procedures of Example V(a), except that whey (or the equivalent, reconstituted whey solids) is used as the culture medium in place of skim milk.

(c) This example follows the procedures of Example V(b), except that a blend made up of equal parts of whole milk, skim milk and whey is used as the culture medium in place of whey. Other blends made up of mixtures of whole milk and skim milk, whole milk and whey and skim milk and whey can also be used as the culture medium in the preparation of the improved inoculum.

PREPARATION OF FLAVORING COMPOSITIONS

The high spore count inocula, prepared as described above, can be used to prepare flavoring compositions in accordance with the fermentation processes described in the Knight applications, supra, and in the processes described below.

The following are examples illustrative of the present invention.

Example VI

| Constituent | Lbs. | Percent |
| --- | --- | --- |
| Homogenized whole milk | 205.0 | 82 |
| Lipolyzed butter oil | 7.5 | 3 |
| Sodium chloride | 12.5 | 5 |
| Inoculum | 25.0 | 10 |
| | 250.0 | 100 |

The lipolyzed butter oil made up of milk fat and fatty acids derived from milk fat can be prepared by treating an emulsion of milk fat with a lipase or the enzyme product of Farnham Patent 2,531,329, in accordance with the general procedure of Farnham Patent 2,794,743 so as to contain approximately 5% free fatty acid calculated as oleic acid. To provide the homogeneous mixture desired for fermentation, the lipolyzed butter oil is melted and blended with the milk with agitation in a 50 gallon stainless steel fermentor, or the milk-melted lipolyzed butter oil mixture is first homogenized and then added to the fermentor. The resulting homogeneous mixture is next sterilized at about 121° C. for 15 minutes, cooled rapidly to about 24–26° C., and the previously sterilized sodium chloride and the *P. roqueforti* inoculum of Example I then added aseptically. The resulting inoculated mixture containing about 0.1–0.2% by weight of free fatty acid is finally allowed to ferment at about 24 to 26° C. with mechanical agitation and aeration (about 1 liter air/liter substrate/minute) for about 24 hours. The fermentation times can vary from about 8 hours or less up to 48 hours or more, depending on the flavor desired, with the longer times producing the more highly flavored product. The amount of inoculum used can also vary depending on fermentation times and flavor, although the use of about 10% inoculum, prepared as described in Example I or II, is a preferred procedure when the fermentation is carried out as in Example VI. The amount of lipolyzed butter oil containing about 3–7% by weight of free fatty acid and used in the fermentation medium can also vary, e.g. from 1–10%, but the amount present at any one time should be below the amount which inhibits fermentation as described in detail below.

Example VII

This example follows the procedure of Example VI, except that skim milk is used in place of the whole milk. The skim milk used in the example can be reconstituted milk made from skim milk solids (NFMS) as well as conventional skim milk.

Example VIII

This example follows the procedure of Example VII, except that whey is used in place of skim milk. The whey used in this example can be reconstituted whey made from whey solids (WS) as well as conventional whey. Mixtures of whole milk and skim milk, whole milk and whey, and skim milk and whey, as well as mixtures of whole milk, skim milk and whey can also be used. Ordinary milk which has not been homogenized can also be used although when using whole milk the use of the homogenized product is preferred as there is less chance of churning (formation of butter). Also, the overall action of the enzymes including the enzymes associated with the spores and spore-like entities, is materially speeded up when the fat and fatty acids are dispersed in minute particles to provide large areas of surface, i.e. more space for enzyme contact.

The flavoring compositions prepared as described above and in the examples below, can be used as such or be concentrated under vacuum and be used in condensed form, or be dried as described in the Knight applications, supra. The liquid preparations should be kept under refrigeration. Prior to storage the compositions should be subjected to a heat treatment of about 270° F. for about 3–5 seconds in a closed system to deactivate the fungi and the enzymes without loss of flavor.

The work carried out in this field has established that the amount of flavor produced during fermentation is dependent to a large extent on the total amounts of free fatty acids available during fermentation, which includes the fatty acids formed in situ by the enzymatic splitting (hydrolysis) of the fats as well as the fatty acids initially present in the lipolyzed butter oil. Following this premise, it appeared that by increasing the amount of available free fatty acids, a product should be obtained with increased amounts of flavoring material. This was considered of utmost importance, as the fermentation process is a batch type operation, and, any modification that would increase the amounts of flavoring material produced during a fermentation run, would be highly desirable. In our investigations, however, we found that fermentation activity decreased as the concentration of the free fatty acids increased. For example, when the 3% lipolyzed butter oil is used in Example VI was increased to 7% lipolyzed butter oil at the start of the fermentation, it was found that fermentation was materially inhibited. In attempts to solve this problem, it was discovered that unlike the fatty acids, the complex chemicals making up the flavoring material, did not inhibit fermentation and that a product containing increased amounts of flavoring material could be obtained by adding small amounts of lipolyzed butter oil continuously or in increments to the fermentation medium during the fermentation process. The following example is illustrative.

*Example IX*

This example is in accordance with Example VI, except that after 12 hours of fermentation, an additional 2% by weight of lipolyzed butter oil is added to the fermentation medium. After another 12-hour fermentation period another 2% by weight of lipolyzed butter oil is added. The fermentation is then concluded with another 12-hour fermentation period. Although this procedure can be repeated by adding like amounts of lipolyzed butter oil followed by like fermentation periods, the characteristic flavor criterion is altered. The product made as described above using a total of 7% lipolyzed butter oil has about 3–6 times the flavor, on a lb./lb. basis, as blue cheese.

In our investigations we have also found that some of the volatile flavoring material is lost in the air during fermentation with conventional aeration. In attempts to solve this problem, we found that loss of flavoring material could be avoided without deleteriously affecting fermentation by carrying out the fermentation with air under pressure, e.g. 15–25 p.s.i.g. The oxygen requirements of the culture and the biological transformations which are known to occur during the fermentation can be supplied by using pure oxygen or blends of air and oxygen.

The following example is illustrative.

*Example X*

This example is in accordance with Example IX, except that the fermentation is carried out with mechanical agitation and with air at about 20 p.s.i.g. In addition to preventing the loss of volatile flavors, the use of pressure also appears to shift the reaction equilibrium to the right, i.e. aid in the conversion of the fatty acids to the desired highly flavored ketones. See the reaction formula in Knight application Serial No. 69,570, supra, which involves the introduction of a ketone (C=O) group on the number 3 carbon atom in the fatty acid chain and the decarboxylation of the fatty acid.

The salt used in the fermentation medium in the preparation of the flavoring composition (see Example VI) is not essential and can be omitted if desired. However, the presence of about 3 to 7% salt is usually employed as it appears to retard the germination of spores to form unwanted mycelia and also improves the overall flavor of the final product. The salt, sugar or mixtures of the same used in the culture medium in the preparation of the inoculum (see Example I), however, is essential, although the exact or full role played by the added salt or sugar is not known. In addition to providing the desired high spore including spore-like entity yield, it is believed, however, that the added salt and/or sugar inhibits germination of the spores and thus prevents the growth and development of large amounts of the unwanted mycelium or like vegetative material. It is also possible that some vegetative material is produced during the early stages of the culturing process and that it is destroyed, for example, to a large extent during the latter stages of the process. The fact that the culture can be used, as such, as the inoculum, without purification or separation of the spores, represents a distinct advance in the art. This is of special importance where large scale fermentations are desired in the commercial production of the flavoring composition.

It is claimed:

1. A process of preparing a high spore count inoculum adaptable for use in the production of flavoring compositions which comprises inoculating a sterile aqueous culture medium, selected from the group consisting of homogenized whole milk, skim milk and whey and mixtures of the same, to which has been added about 1–3% by weight of a product selected from the group consisting of sodium chloride and lactose, with spores of *P. roqueforti*, culturing the resulting culture medium under submerged aerobic conditions for about 3–4 days, aseptically adding about 4–6% by weight of a sterilized product selected from the group consisting of sodium chloride and lactose to the culture medium, and then continuing the culturing of the culture medium for about 1–2 days.

2. The process of claim 1 where the pH of the culture medium is adjusted to about 4.5–5.5 by the addition of a small amount of lactic acid at the start of the culturing period.

3. The process of claim 1 where the spore inoculant is a white mutant of *P. roqueforti*.

4. A process of preparing a high spore count inoculum adaptable for use in the production of flavoring compositions which comprise inoculating sterile homogenized whole milk containing about 2% by weight of added NaCl with spores of a white mutant of *P. roqueforti*, culturing the resulting culture medium under submerged aerobic conditions for about 4 days at about 21–25° C., aseptically adding about 5% by weight of NaCl to the resulting culture medium, and then continuing the culturing of the culture medium for about another day.

5. The process of producing a flavoring composition which comprises inoculating a sterile aqueous culture medium with the inoculum prepared in accordance with claim 1, and then culturing the resulting culture medium under submerged aerobic conditions, said culture medium being selected from the group consisting of homogenized whole milk, skim milk and whey and mixtures of the same, to which lipolyzed butter oil has been added.

6. The process of claim 5 where small amounts of lipolyzed butter oil are added to the culture medium during the culture period.

7. The process of producing a flavoring composition which comprises inoculating sterile homogenized whole milk containing about 3% by weight of lipolyzed butter oil and about 5% by weight of NaCl with about 10% by weight of the inoculum prepared in accordance with claim 4, and then culturing the resulting culture medium under submerged aerobic conditions at about 24–26° C. for about 24 hours.

8. The process of claim 7 where, after a culture period of about 12 hours, an additional 2% by weight of lipolyzed butter oil is added to the culture medium, culturing is continued for about another 12-hour period when an additional 2% by weight of lipolyzed butter oil is added to the culture medium and culturing is concluded with about another 12-hour culturing period.

9. The process of claim 5 where the culture medium is agitated in a closed system in the presence of air at about 15–25 p.s.i.g.

10. The process of claim 7 where the culturing is carried out in a closed system with agitation and with the air at about 20 p.s.i.g.

References Cited in the file of this patent

Jorgensen: Microorganisms and Fermentation, Charles Griffin and Company, Limited, London, 1948, pp. 172, 177 and 200–202.